(No Model.)

T. J. BUSH.
INTERLOCKING BOLT.

No. 444,988. Patented Jan. 20, 1891.

WITNESSES:
John W. Reemer
C. Sedgwick

INVENTOR:
T. J. Bush
BY
Munn & Co.
ATTORNEYS

THE NORRIS PETERS CO., PHOTO-LITHO., WASHINGTON, D. C.

UNITED STATES PATENT OFFICE.

THOMAS J. BUSH, OF LEXINGTON, KENTUCKY.

INTERLOCKING BOLT.

SPECIFICATION forming part of Letters Patent No. 444,988, dated January 20, 1891.

Application filed May 2, 1890. Serial No. 350,344. (No model.)

*To all whom it may concern:*

Be it known that I, THOMAS J. BUSH, of Lexington, in the county of Fayette and State of Kentucky, have invented new and useful Improvements in Interlocking Bolts, of which the following is a full, clear, and exact description.

This invention relates to an improvement in Letters Patent No. 361,984, granted to me April 26, 1887; and the improvement consists in such formation of the bolts that when in use flattened surfaces thereof come in contact with each other, so that all tendency of the bolts to turn is obviated.

The invention also consists in the combination, with the interlocking bolts of adjustable sloping washers, which permit the rail to be adjusted to the proper gage and on slackening the nuts permit the removal and replacement of the rail.

Reference is to be had to the accompanying drawings, forming a part of this specification, in which similar letters of reference indicate corresponding parts in all the figures.

Figure 1:
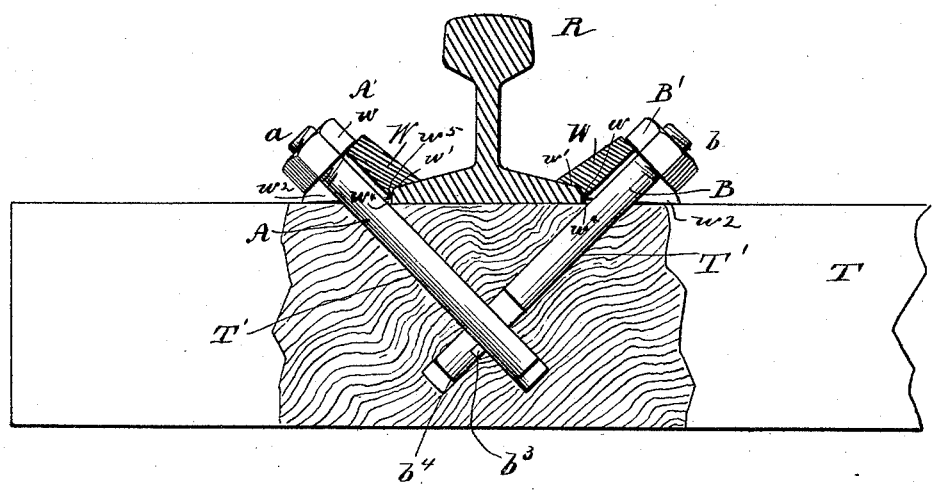
Figures 2, 3:
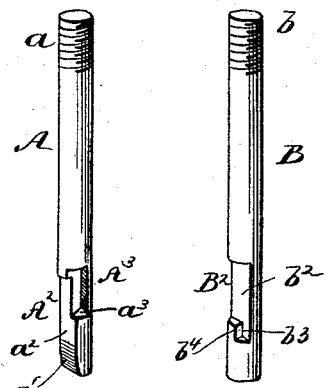
Figure 4:
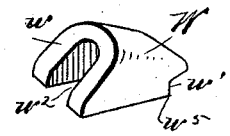
Figure 5:
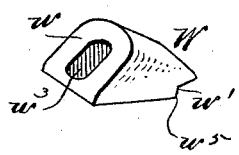

Figure 1 is a sectional elevation showing my invention applied to a railroad rail and cross-tie. Fig. 2 is a perspective view of the male bolt. Fig. 3 is a similar view of the female bolt. Fig. 4 is a perspective view of one form of washer, and Fig. 5 is a perspective view of another form.

The bolts A B are straight and screw-threaded at $a$ $b$ to receive the screw-nuts A' B', which take the place of heads. The male bolt A is faced off at $A^2$ to form the slight bevel $a'$ and also the flat surface $a^2$ between the point where the bevel begins and the shoulder $a^3$. This shoulder $a^3$ is formed by the shallow recess $A^3$, made at right angles to the flat facing $A^2$. The female bolt B is faced off at $B^2$ to form the flat surface $b^2$ above the small recess $b^3$, which forms the locking lug or shoulder $b^4$ to receive the shoulder $a^3$ of the bolt A. When the bolts are in use, the flat surface $a^2$ below the shoulder $a^3$ rests on or in contact with the flat surface of the recesses $b^3$ and $b^2$, so that the bolt cannot turn out of place no matter what strain is put upon it by turning up the nuts.

The bolts are used for holding railway-rails R upon the cross-ties T. The tie is bored with two diagonal intersecting holes T' T' to receive the bolts, and the flange of the rail is held by the beveled washers W W, placed on the bolts and seated at their outer edges on the tie, as shown in Fig. 1. The washers are beveled at their outer faces $w$ at right angles to the bolts to form flat seats for the nuts, and are notched at $w'$ to fit the edge of the flange of the rail.

In the form shown in Figs. 1 and 4 the washers are each formed with an open slot $w^2$, so that the washer may be adjusted to and from the rail, as required, to properly hold the rail in position.

In Fig. 5 the washer is formed with an enlarged opening or slot $w^3$ for the bolt and for adapting it for adjustment; and for this latter purpose the holes are bored in the cross-tie at such distances from each other where they enter the cross-tie that the bolts on either side of the rail will not rest against the bottom of the rail, but will be at such distance therefrom as to permit the adjustment of the rail to the proper track-gage whether the base of the rail is of unequal width, or when, as is the case on curves, the inside of the head of the rail wears away, when readjustment of the track-gage is necessary.

The use of the clamp-plate or washer shown in Fig. 4 will enable the rail to be removed by slacking on the nuts enough to allow the washer to be lifted up until the shoulder clears the bottom of the rail, when they can be removed entirely for the purpose of renewing the rail.

In using the clamp-plates or washers shown in Fig. 5 by slacking up on the nuts the rails can be removed and the same rail or another replaced without removing the nuts from the bolts or removing the clamp-plates or washers from the bolts.

The passage or slot $w^2$ or $w^3$ in the clamp-plates or washers reaches forward to form a clearance $w^4$ between the wall of the washer and the bolt, as shown in Fig. 1, and the holes are set back from the edges of the base of the rail, and a projection $w^5$ occupies the intermediate space between the bolt and the edge of the rail, so that by slackening the nut on one bolt and tightening the other nut the rail may be shifted in either direction to the proper track-gage.

Having thus described my invention, what I claim as new, and desire to secure by Letters Patent, is—

1. The straight bolt A, formed with the shoulder $a^3$ and flat surface $a^2$ below the said shoulder, in combination with the bolt B, formed with the recess $b^3$ in extension of the flat surface $b^2$, substantially as and for the purposes set forth.

2. The straight bolt A, formed with the shoulder $a^3$ and flat surface $a^2$, and the bolt B, formed with the recess $b^3$ and flat surface $b^2$, in combination with the beveled and slotted washers W, substantially as and for the purposes described.

3. The cross-tie having intersecting diagonal holes bored therein a distance apart somewhat greater than the width of the base of the rail, and the straight interlocking bolts placed in said holes, in combination with the washers W, notched to engage with the edges of the rail and slotted to receive the bolts and permit adjustment of the rail and washers, substantially as described.

THOMAS J. BUSH.

Witnesses:
H. A. WEST,
C. SEDGWICK.